United States Patent
Fan

(10) Patent No.: US 12,368,501 B2
(45) Date of Patent: Jul. 22, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/237,080

(22) Filed: Aug. 23, 2023

(65) Prior Publication Data

US 2023/0396325 A1 Dec. 7, 2023

Related U.S. Application Data

(63) Continuation of application No. PCT/CN2021/078201, filed on Feb. 26, 2021.

(51) Int. Cl.
*H04B 7/185* (2006.01)

(52) U.S. Cl.
CPC .................. *H04B 7/18513* (2013.01)

(58) Field of Classification Search
CPC ... H04W 24/04; H04W 56/001; H04W 76/19; H04W 24/10; H04W 36/30; H04B 7/18513
See application file for complete search history.

(56) References Cited

U.S. PATENT DOCUMENTS

| | | | | |
|---|---|---|---|---|
| 2005/0225481 | A1* | 10/2005 | Bonthron | H01Q 21/0093 342/175 |
| 2016/0174037 | A1* | 6/2016 | Lu | H04W 4/026 455/456.1 |
| 2020/0379119 | A1* | 12/2020 | Muramatsu | G01S 19/24 |

(Continued)

FOREIGN PATENT DOCUMENTS

| | | |
|---|---|---|
| CN | 110809292 A | 2/2020 |
| CN | 112312451 A | 2/2021 |
| WO | 2021016889 A1 | 2/2021 |

OTHER PUBLICATIONS

CATT, "Initial Discussion for Idle and Inactive Mode in NTN", R2-2006628, 3GPP TSG-RAN WG2 Meeting #111 electronic Online, Aug. 17-28, 2020.

(Continued)

*Primary Examiner* — Fred A Casca
(74) *Attorney, Agent, or Firm* — BAYES PLLC

(57) ABSTRACT

Embodiments of the present disclosure provide a wireless communication method, a terminal device, and a network device, which can optimize signal tracking and search and reduce signal search delay, thereby improving system performance. The wireless communication method comprises: a terminal device receives first information, the first information being used by the terminal device to search for a signal at a target frequency point, and the first information comprising at least one of the following: ephemeris information associated with the target frequency point, reference information used for adjusting an SMTC window associated with the target frequency point, and cell position or orientation information associated with the target frequency point.

18 Claims, 3 Drawing Sheets

(56) References Cited

U.S. PATENT DOCUMENTS

| | | | | |
|---|---|---|---|---|
| 2021/0037403 A1* | 2/2021 | Kim | .................... | H04W 48/12 |
| 2021/0227533 A1* | 7/2021 | Zhang | .................... | H04B 7/022 |
| 2022/0369249 A1* | 11/2022 | Xie | .................... | H04W 48/16 |
| 2023/0189203 A1* | 6/2023 | Wu | .................... | H04W 36/0088 |
| | | | | 455/456.1 |
| 2023/0262497 A1* | 8/2023 | Sun | .................... | H04W 24/08 |
| | | | | 370/252 |
| 2023/0308172 A1* | 9/2023 | Lin | .................... | H04B 7/18519 |

OTHER PUBLICATIONS

CATT, "Initial Discussion for Connected Mode in NTN", R2-2006629, 3GPP TSG-RAN WG2 Meeting #111 electronic Online, Aug. 17-28, 2020.
International Search Report issued in international application No. PCT/CN2021/078201, mailed Nov. 4, 2021.
Written Opinion of the International Searching Authority issued in international application No. PCT/CN2021/078201, mailed Nov. 4, 2021.
3GPP TS 38.331 V16.3.1 (Jan. 2021); Technical Specification Group Radio Access Network; NR; Radio Resource Control (RRC) protocol specification (Release 16).
Extended European Search Report issued in corresponding European application No. 21927280.4, mailed Feb. 15, 2024.
Source: OPPO; Title: Discussion on mobility management for connected mode UE in NTN 3GPP TSG-RAN WG2 Meeting #111-e R2-2006784 Electronic, Aug. 17-28, 2020.
Source: ZTE Corporation, Sanechips; Title: Consideration on the measurement configuration and reporting in NTN 3GPP TSG-RAN WG2 Meeting#112 R2-2009804 Electronic, Nov. 2-13, 2020.

* cited by examiner

WIRELESS COMMUNICATION METHOD, TERMINAL DEVICE, AND NETWORK DEVICE

CROSS-REFERENCE TO RELATED APPLICATION(S)

This application is a continuation of International Application No. PCT/CN2021/078201 filed on Feb. 26, 2021, the disclosure of which is hereby incorporated by reference in its entirety.

TECHNICAL FIELD

Embodiments of the present disclosure relate to the field of communication, and more particularly, to a wireless communication method, a terminal device, and a network device.

BACKGROUND

For some scenarios where a signal search delay is sensitive, higher requirements are put forward for signal tracking and searching. How to optimize a signal tracking and searching scheme is an urgent problem to be solved.

SUMMARY

Embodiments of the present disclosure provide a wireless communication method, a terminal device, and a network device, which can optimize signal tracking and search and reduce a signal search delay, so as to improve system performance.

In a first aspect, there is provided a wireless communication method, and the method includes:
receiving, by a terminal device, first information, where the first information is used by the terminal device to search for a signal at a target frequency point, and the first information includes at least one of:
ephemeris information associated with the target frequency point;
reference information for adjusting a Synchronization Signal/Physical Broadcast Channel Block Measurement Time Configuration (SMTC) configuration window associated with the target frequency point; and
cell position or orientation information associated with the target frequency point.

In a second aspect, three is provided a wireless communication method, and the method includes:
sending, by a network device, first information to a terminal device, where the first information is used by the terminal device to search for a signal at a target frequency point, and the first information includes at least one of:
ephemeris information associated with the target frequency point;
reference information for adjusting a SMTC configuration window associated with the target frequency point; and
cell position or orientation information associated with the target frequency point.

In a third aspect, there is provided a terminal device, configured to perform the method in the first aspect as described above.

Specifically, the terminal device includes functional modules configured to perform the method in the first aspect as described above.

In a fourth aspect, there is provided a network device, configured to perform the method in the second aspect as described above.

Specifically, the network device includes functional modules configured to perform the method in the second aspect as described above.

In a fifth aspect, there is provided a terminal device, including a processor and a memory. The memory is configured to store a computer program, and the processor is configured to call and run the computer program stored in the memory to perform the method in the first aspect as described above.

In a sixth aspect, there is provided a network device, including a processor and a memory. The memory is configured to store a computer program, and the processor is configured to call and run the computer program stored in the memory to perform the method in the second aspect as described above.

In a seventh aspect, there is provided an apparatus configured to perform the method in any one of the first aspect to the second aspect as described above.

Specifically, the apparatus includes: a processor, configured to call and run a computer program from a memory, so that a device installed with the apparatus performs the method in any one of the first aspect to the second aspect as described above.

In an eighth aspect, there is provided a computer-readable storage medium, configured to store a computer program that causes a computer to perform the method in any one of the first aspect to the second aspect as described above.

In a ninth aspect, there is provided a computer program product, including computer program instructions, which cause the computer to perform the method in any one of the first aspect to the second aspect as described above.

In a tenth aspect, there is provided a computer program which, when run on a computer, causes the computer to perform the method in any one of the first aspect to the second aspect as described above.

Through the above technical solutions, the terminal device can search for a signal at a target frequency point according to at least one of the ephemeris information associated with the target frequency point, the reference information for adjusting the SMTC configuration window associated with the target frequency point, and the cell position or orientation information associated with the target frequency point, thereby reducing the signal search delay and improving the system performance.

DETAILED DESCRIPTION

Figure 1:
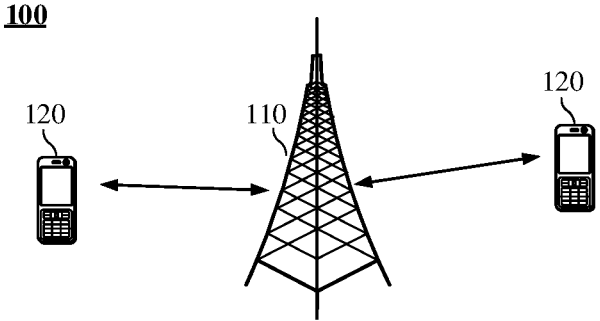
FIG. 1 is a schematic architectural diagram of a communication system to which an embodiment of the present disclosure is applied.
Figure 2:
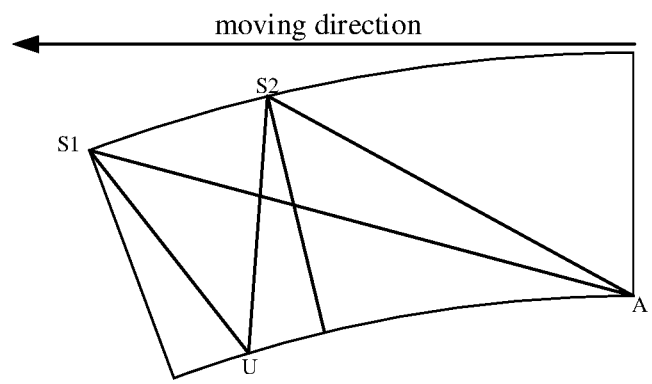
FIG. 2 is a schematic diagram of a transmission delay difference between transparent forwarding satellite links provided by the present disclosure.

The technical solutions in embodiments of the present disclosure will be described below in combination with the drawings in embodiments of the present disclosure. Obviously, the described embodiments are part of embodiments of the present disclosure, rather than all the embodiments. For embodiments in the present disclosure, all other embodiments acquired by a person of ordinary skill in the art without creative work shall fall within the protection scope of the present disclosure.

The technical solutions in embodiments of the present disclosure are applicable to various communication systems, for example, a global system of mobile communication (GSM) system, a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a Non-Terrestrial Network (NTN) system, a universal mobile telecommunication system (UMTS), a wireless local area network (WLAN), a wireless fidelity (WiFi), a 5th-Generation (5G) communication system, or other communication systems.

Generally speaking, a conventional communication system generally supports a limited number of connections, and therefore is easy to implement. However, with development of the communication technology, a mobile communication system will not only support conventional communication, but also support, for example, device to device (D2D) communication, machine to machine (M2M) communication, machine type communication (MTC), vehicle to vehicle (V2V) communication, or vehicle to everything (V2X) communication, etc. Embodiments of the present disclosure may also be applied to these communication systems.

In some embodiments, a communication system in embodiments of the present disclosure may be applied to a carrier aggregation (CA) scenario, a dual connectivity (DC) scenario, or a standalone (SA) networking scenario.

In some embodiments, the communication system in embodiments of the present disclosure may be applied to an unlicensed spectrum, where the unlicensed spectrum may also be considered as a shared spectrum. Alternatively, the communication system in embodiments of the present disclosure may also be applied to a licensed spectrum, where the licensed spectrum may also be considered a non-shared spectrum.

Embodiments of the present disclosure describe various embodiments in conjunction with a network device and a terminal device. The terminal device may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc.

The terminal device may be a station (ST) in WLAN. Alternatively, the terminal device may be a cellular phone, a cordless phone, a Session Initiation Protocol (SIP) phone, a Wireless Local Loop (WLL) station, a Personal Digital Assistant (PDA) device, a handheld device or a computing device with a wireless communication function, other processing devices connected to a wireless modem, a vehicle-mounted device, a wearable device, or a terminal device in a next generation communication system, such as a terminal device in an NR network, or a terminal device in a future evolved Public Land Mobile Network (PLMN).

In embodiments of the present disclosure, the terminal device may be deployed on land, including indoor or outdoor, handheld, wearable, or vehicle-mounted terminal device. The terminal device may also be deployed on a water surface, such as on a ship. The terminal device may also be deployed in air, for example, on an aircraft, a balloon, a satellite, etc.

In embodiments of the present disclosure, the terminal device may be a mobile phone, a pad, a computer with a wireless transceiving function, a Virtual Reality (VR) terminal device, an Augmented Reality (AR) terminal device, a wireless terminal device in industrial control, a wireless terminal device in self-driving, a wireless terminal device in remote medical, a wireless terminal device in smart grid, a wireless terminal device in transportation safety, a wireless terminal device in smart city, or a wireless terminal device in smart home.

By way of example but not limitation, in embodiments of the present disclosure, the terminal device may be a wearable device. The wearable device may also be called a wearable intelligent device, which is a general term of wearable devices designed intelligently and developed on daily wear using wearable technology, such as glasses, gloves, a watch, clothing, and shoes. The wearable device is a portable device that is worn directly on a body or integrated into a user's clothes or accessories. The wearable device is not only a hardware device, but also implements powerful functions through software support, data interaction, and cloud interaction. Generalized wearable intelligent devices include: a device with full features, a large size, and full or partial functions which may be implemented without relying on a smart phone, for example, a smart watch or smart glasses; as well as a device that is only focused on a certain application function and needs to cooperate with other devices such as a smart phone, for example, a smart bracelet and a smart jewelry for various physical sign monitoring.

In embodiments of the present disclosure, the network device may be a device for communicating with a mobile device, or an Access Point (AP) in WLAN, or a Base Transceiver Station (BTS) in GSM or CDMA, or a NodeB (NB) in WCDMA, or an Evolutional Node B (eNB or eNodeB) in Long Term Evolution (LTE), or a relay station or an access point, or a vehicle-mounted device, a wearable device, a network device or a base station (gNB) in the NR network, a network device in the future evolved PLMN network, or a network device in the NTN network.

As an example but not limitation, in embodiments of the present disclosure, the network device may have a mobile feature. For example, the network device may be a mobile device. In some embodiments, the network device may be a satellite, a balloon station. For example, a satellite may be a low earth orbit (LEO) satellite, a medium earth orbit (MEO) satellite, a geostationary earth orbit (GEO) satellite, a high octagonal orbit (HEO) satellite, etc. In some embodiments, the network device may also be a base station disposed on land or in a water area.

In embodiments of the present disclosure, the network device provides services for a cell, and the terminal device communicates with the network device through transmission resources (for example, frequency domain resources, or spectrum resources) used by the cell. The cell may be a cell corresponding to the network device (e.g., a base station), and the cell may belong to a macro base station, or belong to a base station corresponding to a small cell. Here, the small cell may include a metro cell, a micro cell, a pico cell, a femto cell, etc. These small cells have characteristics such as small coverage and low transmit power, and are suitable for providing high-speed data transmission services.

Exemplarily, a communication system 100 applied in embodiments of the present disclosure is shown in FIG. 1. The communication system 100 may include a network device 110. The network device 110 may be a device communicating with a terminal device 120 (or referred to as a terminal or communication terminal). The network device 110 may provide communication coverage over a specific geographic region, and may communicate with the terminal device located within the coverage region.

FIG. 1 exemplarily shows one network device and two terminal devices. In some embodiments, the communication system 100 may include a plurality of network devices, and a coverage range of each network device may include other numbers of terminal devices, which is not limited by embodiments of the present disclosure.

In some embodiments, the communication system 100 may also include other network entities such as a network controller and a mobile management entity, which is not limited by embodiments of the present disclosure.

It should be understood that a device having a communication function in a network or system according to embodiments of the present disclosure may be referred to as a communication device. The communication system 100 shown in FIG. 1 is taken as an example. The communication device may include a network device 110 and a terminal device 120 which have communication functions. The network device 110 and the terminal device 120 may be the above-mentioned specific devices, and descriptions thereof are omitted here. The communication device may also include other devices in the communication system 100, such as other network entities including the network controller, the mobile management entity, and the like, which is not limited by embodiments of the present disclosure.

It should be understood that the terms "system" and "network" may often be interchanged herein. The term "and/or" herein only indicates an association relationship that describes associated objects, and represents that there may be three relationships. For example, A and/or B may represent cases where A exists alone, A and B exist simultaneously, and B exists alone. In addition, the character "/" herein generally indicates that proceeding and following objects associated thereby are in an "or" relationship.

Terminologies used in the DETAILED DESCRIPTION section of the present disclosure are only for the purpose of explaining specific embodiments of the present disclosure, and are not intended to limit the present disclosure. The terms "first", "second", "third" and "fourth", or the like in the description, claims and drawings of the present disclosure are used to distinguish different objects, but not used to describe a specific order. Furthermore, the terms "include/comprise", "have", and any variations thereof are intended to cover non-exclusive inclusion.

It should be understood that "indication/indicating" as mentioned in embodiments of the present disclosure may be direct indication or indirect indication, and may also represent there is an association relationship. For example, if A indicates B, it may mean that A directly indicates B. For example, B may be acquired through A. Also, it may mean that A indirectly indicates B. For example, A indicates C, and B may be acquired through C. Besides, it may also mean that there is an association relationship between A and B.

In the description of embodiments of the present disclosure, the term "corresponding/respective" may mean that there is a direct or indirect correspondence between two items, or may mean that there is an association relationship between the two items, or may also mean that there is an indicating-and-indicated relationship or a configuring-and-configured relationship between the two items.

In embodiments of the present disclosure, "predefinition/predefined" may mean that it is realized by pre-saving, in devices (for example, including the terminal device and the network device), corresponding codes, tables or other ways that can be used to indicate relevant information, and its specific implementation is not limited by the present disclosure. For example, the predefinition may refer to a definition in a protocol.

In embodiments of the present disclosure, the "protocol" may refer to a standard protocol in a communication field, which. For example, the "protocol" may include a LTE protocol, a NR protocol, and a related protocol applied to a future communication system, which is not limited by the present disclosure.

In a 5G network environment, in order to reduce the air interface signaling and quickly recover wireless connections and data services, a new Radio Resource Control (RRC) state is defined, namely a RRC_INACTIVE state, which is different from a RRC_IDLE state and a RRC_CONNECTED state. The RRC_IDLE state indicates that the mobility means UE-based cell selection and reselection, the paging is initiated by a Core Network (CN), and a paging area is configured by the CN. There is no UE Access Stratum (AS) context at a base station side, and there is no RRC connection. The RRC_CONNECTED state indicates that: there is a RRC connection, and the base station and the UE have the UE AS context; and the network device knows that a position of the UE is at a specific cell level. The mobility means mobility controlled by a network device. Unicast data may be transmitted between the UE and the base station. The RRC_INACTIVE state indicates that the mobility means UE-based cell selection and reselection, there is a connection between CN-NR, the UE AS context exists on a certain base station, the paging is triggered by a Radio Access Network (RAN), and a RAN-based paging area is managed by the RAN, and the network device knows the position of the UE is at a RAN-based paging area level In order to better understand embodiments of the present disclosure, measurements related to the present disclosure will be described.

A measurement process of the terminal device is generally used to obtain a signal measurement result of a measured object, and evaluation indicators for the signal measurement result include a Reference Signal Received Power (RSRP), Reference Signal Received Quality (RSRQ), or Signal to Interference plus Noise Ratio (SINR) measurement result of the measured object.

For a terminal device in a connected state, in order to allow the terminal devices in the connected state to selectively perform the measurement process, the network side typically configures one or more Measurement Objects (MOs) for the terminal device through a dedicated signaling. Each piece of MO configuration information includes information about one target frequency point. Alternatively, one piece of MO configuration information may include both information about one target frequency point and Physical Cell Identity (PCI) list information associated with this target frequency point. To identify a cell, the terminal needs to determine both the frequency point and the PCI information corresponding to the cell. However, since there are only 1008 NR PCIs, the terminal device may also search for the target cell through a PCI traversal method when the MO configuration information only contains the target frequency point information. On the other hand, if the network side informs the terminal device of both the frequency point and the PCI list information of the measurement object, the cell search of the terminal device may be speeded up.

For a terminal device in an idle state or an inactive state, the purpose for performing the measurement is generally to obtain a signal measurement result of at least one neighbor cell, so as to control a process of selecting/reselecting a serving cell of the terminal device. Different from configuring the measurement object configuration information through the dedicated signaling in the connected state, the terminal device in the idle state or inactive state has not established the RRC connection with the network side. In this case, the measurement object configuration information is obtained through a cell system broadcast message or a connection release message received by the terminal device when it left the connected state last time. The content of the measurement object configuration information is similar to the MO configuration information in the connected state, and also includes information about one target frequency point or includes the information about one target frequency point and the PCI list information associated with this target frequency point.

In order to better understand embodiments of the present disclosure, the handover process related to the present disclosure will be described.

A handover process is a behavior triggered by the network side. The terminal device has not known that the handover process is being executed, until it receives a synchronous reconfiguration message or a conditional synchronous reconfiguration message sent by the network side. Upon receiving the synchronous reconfiguration message or the configured conditional synchronous reconfiguration event trigger, the terminal device will immediately initiate an access process to a handover target cell by applying the configuration information contained in the conditional synchronous reconfiguration message or the synchronous reconfiguration message. The synchronous reconfiguration message or the conditional synchronous reconfiguration message sent by the network side typically includes the configuration information of the handover target cell, such as service frequency point information of the handover target cell. Before the terminal device accesses the handover target cell, it first needs to complete the downlink synchronization with the handover target cell, and the terminal needs to use the service frequency point information of the handover target cell to complete the downlink synchronization process with the handover target cell.

In order to better understand embodiments of the present disclosure, the redirection process related to the present disclosure will be described.

In a redirection process, the network side configures redirection configuration information for the terminal device through a connection release message. An objective of the redirection function is mainly to achieve network load balancing and selectively release the terminal device to a cell that supports a specific frequency point. The redirection configuration information typically includes redirection target frequency point information. After obtaining the redirection configuration information, the terminal resides on a cell that supports the corresponding frequency point according to the indication of the redirection configuration information.

In order to better understand embodiments of the present disclosure, the satellite cell related to the present disclosure will be described.

Satellites can be classified as Geostationary Earth Orbiting (GEO) satellites, Medium Earth Orbiting (MEO) satellites, or Low Earth Orbiting (LEO) satellites. The GEO satellite has a large coverage (three GEO satellites usually cover the whole world) and is stationary relative to the ground. In this case, there are very few opportunities for the terminal device to perform the mobility measurement, and the terminal device can basically work by multiplexing ground measurement reporting rules. However, for the MEO or LEO satellite, due to the high-speed movement of such satellite relative to the ground (a ground speed of the LEO satellite can reach 7.8 kilometers per second, and an effective service duration provided by the LEO satellite is only a few seconds to tens of seconds). In this case, the terminal device has to quickly complete the measurement reporting so as to reduce the risk of off-network.

Furthermore, when a satellite cell signal is a signal of the low frequency band FR1, the terminal device mostly uses an omnidirectional antenna, which can receive the satellite cell signal relatively quickly. When the satellite cell signal is a signal of the high frequency band FR2, in order to offset an attenuation characteristics of the high frequency signal, the terminal device mostly use a directional antenna to receive the signal. In this case, the high speed movement of the satellite greatly increases the difficulty for the terminal device to use the directional antenna to capture the satellite cell signal. Without additional auxiliary information, it is basically difficult for the terminal device to use the directional antenna to realize the rapid measurement of the satellite cell signal.

In order to better understand embodiments of the present disclosure, the propagation delay difference between transparent forwarding satellite links related to the present disclosure will be described.

A represents a gateway (basically equivalent to the base station), S1 represents a satellite 1, S2 represents a satellite 2, a point U represents a position of the terminal, and a solid line A-S1-U represents a signal link that the gateway communicates with the terminal via forwarding by the satellite 1, which is represented by L1. Besides, a dotted line A-S2-U represents a signal link that the gateway communicates with the terminal via forwarding by the satellite 2, which is represented by L2. Different from a ground system, L1 is quite different from L2 in terms of distance, which may be up to 0 to thousands of kilometers. In other words, a difference in the propagation delay caused by the two satellite signal forwarding links may be up to 0 to tens of ms (the propagation speed of electromagnetic waves in the air is about 300 km/ms), and such a propagation delay difference is even larger than the SMTC configuration window (maximum 5 ms)/the measurement interval window (maximum 6 ms). In addition, different terminals are located at different geographical positions, and experience different differences in the inter-satellite propagation delay. It should be noted that for the transparent forwarding satellites, a link between the terminal and the satellite is called a service link, and a link between the gateway and the satellite is called a feed link.

For scenarios that are sensitive to the signal search delay, such as LEO/MEO scenarios, it is not appropriate to simply reuse the ground signal search mechanism. For example, compared with the ground system, the high-speed movement of the satellite greatly increases difficulty for the terminal to capture a satellite signal in a satellite communication system. If the terminal further uses a directional antenna, it is quite difficult for the terminal to use the directional antenna to achieve tracking and searching of the high-speed mobile satellite cell signal without additional auxiliary information, and in severe cases, the terminal may be at risk of off-network.

In view of the above problems, the present disclosure proposes a solution for searching a signal. The terminal device can search for the signal at a target frequency point according to at least one of ephemeris information associated with the target frequency point, reference information for adjusting a SMTC configuration window associated with the target frequency point, and cell position or orientation information associated with the target frequency point, thereby reducing the signal search delay and improving the system performance.

The technical solutions of the present disclosure are described in detail below through specific embodiments.

Figure 3:
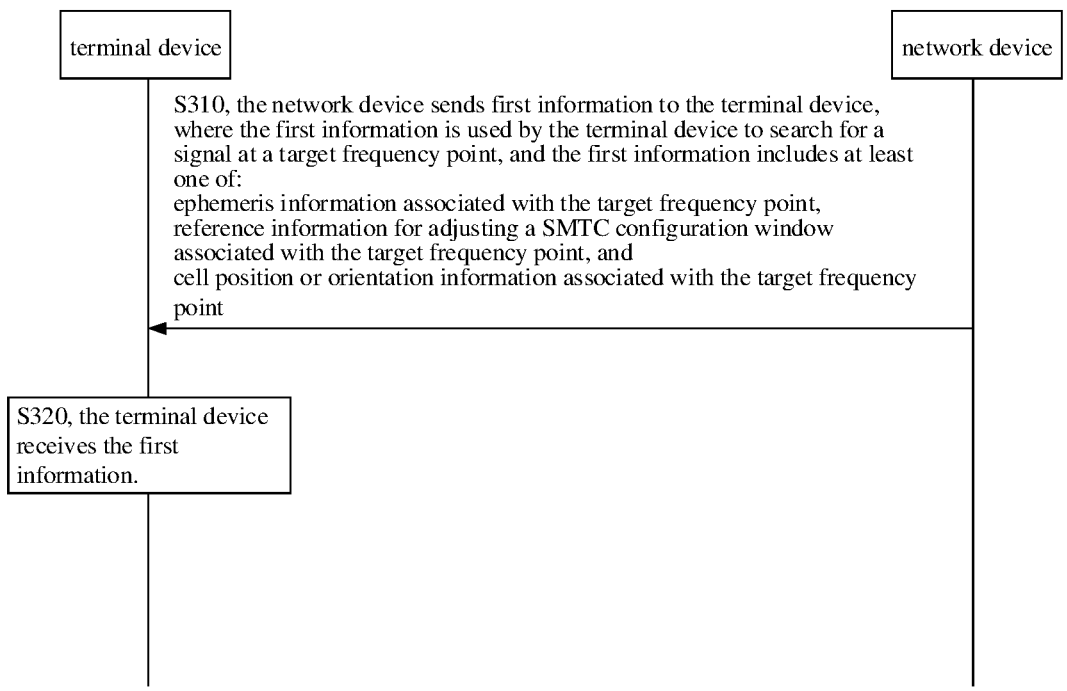
FIG. 3 is a schematic flowchart of a wireless communication method provided according to an embodiment of the present disclosure.

FIG. 3 is a schematic flowchart of a wireless communication method 300 according to an embodiment of the present disclosure. As shown in FIG. 3, the method 300 may include at least part of the following contents.

In S310, a network device sends first information to a terminal device, where the first information is used by the terminal device to search for a signal at a target frequency point, and the first information includes at least one of:
  ephemeris information associated with the target frequency point;
  reference information for adjusting a SMTC configuration window associated with the target frequency point; and
  cell position or orientation information associated with the target frequency point.

In S320, the terminal device receives the first information.

In embodiments of the present disclosure, the terminal device can know position and direction of the satellite associated with the target frequency point based on the ephemeris information associated with the target frequency point, and the terminal device can also know a time domain position of the SMTC window based on the reference information for adjusting the SMTC configuration window associated with the target frequency point. Therefore, when the terminal device searches for the signal at the target frequency point, it can conduct the signal search in combination with at least one of position and direction of the satellite associated with the target frequency point, the time domain position of the SMTC window, and the cell position or orientation information associated with the target frequency point. Thus, the signal search can be performed quickly and accurately, which reduces the signal search delay, and can also avoid the risk of off-network caused by untimely measurement.

It should be noted that the target frequency point may be associated with one or more satellites. Exemplarily, the satellite associated with the target frequency point may be a neighbor satellite of a service satellite. Furthermore, one service satellite may be associated with one or more neighbor satellites. The ephemeris information included in the first information may be ephemeris information corresponding to a specific satellite associated with the target frequency point. Alternatively, the ephemeris information included in the first information may be ephemeris information corresponding to any satellite associated with the target frequency point. Further alternatively, the ephemeris information included in the first information may be ephemeris information corresponding to all satellites associated with the target frequency point.

It should be understood that among the cell position or orientation information, the cell position information may be used to indicate geographic position coordinates of the cell, and the cell orientation information may be used to indicate a direction of the cell.

In some embodiments, the present disclosure may be applied to scenarios sensitive to the signal search delay, such as a scenario in which a signal carrier quickly moves (such as a LEO/MEO scenario), a high-frequency signal scenario, and a scenario sensitive to measurement time-consuming requirements.

In some embodiments, the first information further includes but is not limited to at least one of:
  information about the target frequency point;
  PCI list information associated with the target frequency point;
  SMTC information associated with the target frequency point;
  Subcarrier Spacing (SCS) information associated with the target frequency point; and
  frequency band information associated with the target frequency point.

The information about the target frequency point may be the target frequency point or an identity or index used to represent the target frequency point. Alternatively, the information about the target frequency point may be configuration information of the target frequency point.

In some embodiments, when the first information does not include the information about the target frequency point, the information about the target frequency point is preconfigured or agreed by a protocol. When the first information includes the reference information for adjusting the SMTC configuration window associated with the target frequency point, and does not include the SMTC information associated with the target frequency point, the SMTC information associated with the target frequency point is preconfigured or agreed by a protocol.

In some embodiments, the reference information for adjusting the SMTC configuration window associated with the target frequency point includes at least one of:
  information about an amount of difference in propagation time delay between feed link signals for a service satellite of the terminal device and a satellite associated with the target frequency point;
  information about a rate of change in time of the amount of difference in propagation time delay between the feed link signals for the service satellite of the terminal device and the satellite associated with the target frequency point;
  reference point information;
  information about an amount of difference in propagation time delay between link signals from a service cell of the terminal device to a reference point and from a cell associated with the target frequency point to the reference point;
  information about a rate of change in time of the amount of difference in propagation time delay between the link signals from the service cell of the terminal device to the reference point and from the cell associated with the target frequency point to the reference point; and information about a rate of change in time of the SMTC information associated with the target frequency point.

It should be noted that the information about the amount of difference in propagation time delay between the feed link signals is an amount of difference between the propagation delay of the feed link signal for the service satellite of the terminal device and the propagation delay of the feed link signal for the satellite associated with the target frequency point. The feed link signal for the service satellite of the terminal device may refer to a signal transmitted on a link between the service satellite of the terminal device and the gateway. The feed link signal for the satellite associated with the target frequency point may refer to a signal transmitted on a link between the satellite associated with the target frequency point and the gateway.

In some embodiments, when the reference information for adjusting the SMTC configuration window associated with the target frequency point does not include the reference point information, the reference point information may be preconfigured or agreed by a protocol.

In some embodiments, the reference point information may be, for example, coordinates or a position of the reference point. Alternatively, the reference point information may be, for example, information for indicating coordinates or a position of the reference point.

In some embodiments, the time reference point for the information about the rate of change is preconfigured or agreed by a protocol. Alternatively, the time reference point for the information about the rate of change is configured by the network device through the first information.

In some embodiments, the ephemeris information associated with the target frequency point includes at least one of:

ephemeris data information, index or identification information corresponding to the ephemeris data information.

The ephemeris data in embodiments of the present disclosure has a similar meaning to satellite orbit operation data and ephemeris commonly used in a satellite communication field. Generally speaking, the ephemeris means to inform a user of vector information about an initial position state of the satellite at a defined starting point in time, and information about the starting point in time is typically common and does not need to be bound to a specific satellite separately. Apart from this, six parameters are required to represent orbit operation data of one satellite, in which an absolute space position vector of the satellite needs to be represented by three parameters, and a space speed vector of the satellite needs to be represented by three parameters. Then, theoretically speaking, after the orbit operation data of the one satellite is obtained, spatial position information of this satellite at any point of time in the future can be accurately calculated and predicted.

In some embodiments, the ephemeris data may be associated with a type of index identification information. An example is an explicit index method, in which one piece of ephemeris data is associated with one index identity. Simply speaking, a simple name is given to one piece of ephemeris data, so that the corresponding ephemeris data can be used by means of the name, as shown in Table 1. Another example is an implicit index method, in which all ephemeris data form a list, and one piece of ephemeris data is associated with an element position number value of this ephemeris data in the list, as shown in Table 2.

TABLE 1

| index identity 1 | index identity 2 | ... | index identity N |
|---|---|---|---|
| ephemeris data 1 | ephemeris data 2 | ... | ephemeris data N |

In Table 1, one piece of ephemeris data is associated with one index identity. The number of bits occupied by the index identity is generally less, and the use of the index identity saves more system overhead than the use of the ephemeris data.

TABLE 2

| List element position number 1 | List element position number 2 | ... | List element position number M |
|---|---|---|---|
| Ephemeris data 1 | Ephemeris data 2 | ... | Ephemeris data M |

In Table 2, one piece of ephemeris data is associated with the element position number value of the ephemeris data in the list. The value of the list element position number generally starts from 0 or 1, and the use of information about the list element position number saves more system overhead than the use of the ephemeris data.

It should be noted that parameters N and M in the above Tables 1 to 2 are positive integers, where N≥1 and M≥1.

In some embodiments, the ephemeris information associated with the target frequency point is configured according to a frequency point granularity or a PCI granularity.

For example, the ephemeris information associated with the target frequency point may be configured according to the frequency point granularity as shown in Table 3.

TABLE 3

| Frequency point information 1 | Frequency point information 2 | ... | Frequency point information N |
|---|---|---|---|
| Ephemeris information 1 | Ephemeris information 2 | ... | Ephemeris information N |

In Table 3, each piece of frequency point information is associated with one set of ephemeris information. The parameter N in Table 3 is a positive integer, where N 1.

For another example, the ephemeris information of the target frequency point may be configured according to the PCI granularity as shown in Table 4.

TABLE 4

| Frequency point information 1 | PCI1 | Ephemeris information 1 |
|---|---|---|
| | PCI2 | Ephemeris information 2 |
| Frequency point information 2 | PCI3 | Ephemeris information 3 |
| | PCI4 | Ephemeris information 4 |

In Table 4, each piece of frequency point information is associated with at least one piece of PCI information, each piece of PCI information is directly associated with one set of ephemeris information, and the ephemeris-related configuration information is configured according to the PCI granularity.

In some embodiments, the first information is carried by one of: a system broadcast message, and a dedicated signaling.

Exemplarily, the first information may be carried by any one of: a handover configuration message, a synchronous reconfiguration message, a redirection configuration message, and a measurement configuration message.

In view of the above embodiments, how the terminal device searches for the signal at the target frequency point based on the first information is exemplarily described as follows.

Example 1: the MED or LEO satellite moves at a high speed relative to the ground. Especially for the terminal device using the directional antenna, the frequency point information configured by the network side is not enough to allow the terminal device to quickly search for the signal generated or forwarded by the satellite associated with the target frequency point. However, after knowing the ephemeris information associated with the target frequency point, the terminal device can quickly rotate the antenna and align it with the airspace where the satellite associated with the target frequency point is located, so as to realize the rapid search of the satellite signal and avoid the risk of off-network caused by the terminal untimely searching for the signal.

It is assumed that information included in the reference information for adjusting the SMTC configuration window associated with the target frequency point corresponds to configurations 1 to 7, respectively. For example, the configuration 1 is the information about the amount of difference in propagation time delay between the feed link signals for the service satellite of the terminal device and the satellite associated with the target frequency point. The configuration 2 is the information about the rate of change in time of the amount of difference in propagation time delay between the feed link signals for the service satellite of the terminal device and the satellite associated with the target frequency point. The configuration 3 is the reference point information. The configuration 4 is the information about the amount of difference in propagation time delay between the link signals from the service cell of the terminal device to the reference point and from the cell associated with the target frequency point to the reference point. The configuration 5 is the information about the rate of change in time of the amount of difference in propagation time delay between the link signals from the service cell of the terminal device to the reference point and from the cell associated with the target frequency point to the reference point. The configuration 6 is the information about the rate of change in time of the SMTC information associated with the target frequency point. The configuration 7 is the time reference point associated with the information about the rate of change.

Example 2: for a scenario where the configuration 1 is separately used, if the amount of difference in propagation time delay between the feed link signals for the service satellite of the terminal device and the satellite associated with the target frequency point does not change much (or approximately unchanged) in a short period of time, the terminal device may obtain an actual position in time domain of the SMTC window associated with the target frequency point by reference to the SMTC information associated with the target frequency point as well as the information about the amount of difference in propagation time delay between the feed link signals for the service satellite of the terminal device and the satellite associated with the target frequency point, thereby searching for the signal at the target frequency point.

Example 3: for a scenario where the configuration 2 is separately used, if the change in time of the amount of difference in propagation time delay between the feed link signals for the service satellite of the terminal device and the satellite associated with the target frequency point is predictable, the terminal device is informed of the information about the rate of change in time of the amount of difference in propagation time delay between the feed link signals for the service satellite of the terminal device and the satellite associated with the target frequency point. As such, the terminal device may obtain an actual position in time domain of the SMTC window associated with the target frequency point by reference to the SMTC information associated with the target frequency point as well as the information about the rate of change in time of the amount of difference in propagation time delay between the feed link signals for the service satellite of the terminal device and the satellite associated with the target frequency point, thereby searching for the signal at the target frequency point. The information about the rate of change in Example 3 may be preconfigured or agreed in a protocol, or used as a reference in a default configuration. The default configuration may be the SMTC information associated with the target frequency point or other common configuration information.

Example 4: for a scenario where the configuration 1 and the configuration 2 are used in combination, the information about the rate of change in the configuration 2 is based on the configuration 1, and the terminal device may obtain the actual position in time domain of the SMTC window associated with the target frequency point by reference to the SMTC information associated with the target frequency point, the configuration 1, and the configuration 2, thereby searching for the signal at the target frequency point.

Example 5: usage scenarios of the configuration 4 and the configuration 5 are described similarly to the configuration 1 and the configuration 2, and also include a scenario where the configuration 4 is separately used, a scenario where the configuration 5 is separately used, and a scenario where the configuration 4 and the configuration 5 are used in combination. For the last case, the reference point mentioned in the configuration 4 and the configuration 5 is known by default and does not need to be explicitly configured by the network side. For a scenario where the configuration 3 is explicitly configured, it may be classified as a scenario where the configuration 3 and the configuration 4 are used in combination, a scenario where the configuration 3 and the configuration 5 are used in combination, and a scenario where the configuration 3, the configuration 4 and the configuration 5 are used in combination. The specific idea in assisting the terminal to adjust the actual position in time domain of the SMTC window associated with the target frequency point is similar to that in the scenarios of the configuration 1 and the configuration 2, which will not be repeated here.

Example 6: for a scenario where the configuration 6 is separately used, if the change in time of the SMTC information associated with the target frequency point is predictable, the terminal device may obtain an actual position in time domain of the SMTC window associated with the target frequency point by reference to the SMTC information associated with the target frequency point and the configuration 6, thereby searching for the signal at the target frequency point.

It should be noted that when the information about the rate of change mentioned in the configuration 2, the configuration 5, and the configuration 6 needs to be associated with the time reference point information, the configuration 7 may be configured; and otherwise, the information about the rate of change mentioned in the configuration 2, the configuration 5, and the configuration 6 uses the common default time reference point information.

Therefore, in embodiments of the present disclosure, the terminal device can search for the signal at the target frequency point according to at least one of the ephemeris information associated with the target frequency point, the reference information for adjusting the SMTC configuration window associated with the target frequency point, and the cell position or orientation information associated with the target frequency point. Thus, the signal search can be performed quickly and accurately, which reduces the signal search delay, and also avoids the risk of off-network caused by untimely measurement.

The method embodiments of the present disclosure are described in detail above with reference to FIG. 3, and the apparatus embodiments of the present disclosure are described in detail below with reference to FIGS. 4 to 8. It should be understood that the apparatus embodiments and the method embodiments correspond to each other, and for the similar description, reference may be made to the method embodiments.

Figure 4:
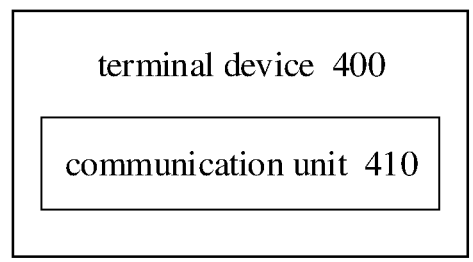
FIG. 4 is a schematic block diagram of a terminal device provided according to an embodiment of the present disclosure.

FIG. 4 shows a schematic block diagram of a terminal device 400 according to an embodiment of the present disclosure. As shown in FIG. 4, the terminal device 400 includes:
 a communication unit 410, configured to receive first information, where the first information is used by the terminal device to search for a signal at a target frequency point, and the first information includes at least one of:
 ephemeris information associated with the target frequency point;
 reference information for adjusting a Synchronization Signal/Physical Broadcast Channel Block Measurement Time Configuration (SMTC) configuration window associated with the target frequency point; and
 cell position or orientation information associated with the target frequency point.

In some embodiments, the first information further includes at least one of:
 information about the target frequency point;
 Physical Cell Identity (PCI) list information associated with the target frequency point;
 SMTC information associated with the target frequency point;
 SubCarrier Spacing (SCS) information associated with the target frequency point; and
 frequency band information associated with the target frequency point.

In some embodiments, the reference information for adjusting the SMTC configuration window associated with the target frequency point includes at least one of:
 information about an amount of difference in propagation time delay between feed link signals for a service satellite of the terminal device and a satellite associated with the target frequency point;
 information about a rate of change in time of the amount of difference in propagation time delay between the feed link signals for the service satellite of the terminal device and the satellite associated with the target frequency point;
 reference point information;
 information about an amount of difference in propagation time delay between link signals from a service cell of the terminal device to a reference point and from a cell associated with the target frequency point to a reference point;
 information about a rate of change in time of the amount of difference in propagation time delay between the link signals from the service cell of the terminal device to the reference point and from the cell associated with the target frequency point to the reference point; and
 information about a rate of change in time of the SMTC information associated with the target frequency point.

In some embodiments, time reference point for the information about the rate of change is preconfigured or agreed by a protocol, or the time reference point for the information about the rate of change is configured by a network device through the first information.

In some embodiments, the ephemeris information associated with the target frequency point includes at least one of:
 ephemeris data information, and index or identification information corresponding to the ephemeris data information.

In some embodiments, the ephemeris information associated with the target frequency point is configured according to a frequency point granularity or a PCI granularity.

In some embodiments, the reference information for adjusting the SMTC configuration window associated with the target frequency point is configured according to the frequency point granularity or the PCI granularity.

In some embodiments, the first information is carried by one of: a system broadcast message, and a dedicated signaling.

In some embodiments, the aforementioned communication unit may be a communication interface or a transceiver, or an input/output interface of a communication chip or a system-on-chip.

It should be understood that the terminal device 400 according to embodiments of the present disclosure may correspond to the terminal device in the method embodiments of the present disclosure, and the abovementioned and other operations and/or functions of each unit in the terminal device 400 are to implement respective processes of the terminal device in the method 300 shown in FIG. 3, respectively, and will not be repeated here for brevity.

Figure 5:
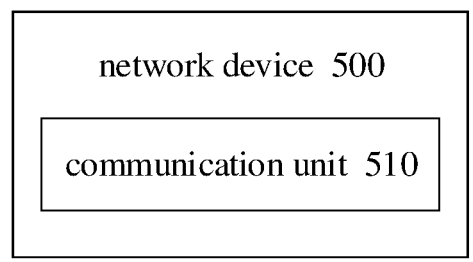
FIG. 5 is a schematic block diagram of a network device provided according to an embodiment of the present disclosure.

FIG. 5 shows a schematic block diagram of a network device 500 according to an embodiment of the present disclosure. As shown in FIG. 5, the network device 500 includes:
 a communication unit 510, configured to send first information to a terminal device, where the first information is used by the terminal device to search for a signal at a target frequency point, and the first information includes at least one of:
 ephemeris information associated with the target frequency point;
 reference information for adjusting a Synchronization Signal/Physical Broadcast Channel Block Measurement Time Configuration (SMTC) configuration window associated with the target frequency point; and
 cell position or orientation information associated with the target frequency point.

In some embodiments, the first information further includes at least one of:
 information about the target frequency point;
 Physical Cell Identity (PCI) list information associated with the target frequency point;
 SMTC information associated with the target frequency point;
 SubCarrier Spacing (SCS) information associated with the target frequency point; and
 frequency band information associated with the target frequency point.

In some embodiments, the reference information for adjusting the SMTC configuration window associated with the target frequency point includes at least one of:

information about an amount of difference in propagation time delay between feed link signals for a service satellite of the terminal device and a satellite associated with the target frequency point;
information about a rate of change in time of the amount of difference in propagation time delay between the feed link signals for the service satellite of the terminal device and the satellite associated with the target frequency point;
reference point information;
information about an amount of difference in propagation time delay between link signals from a service cell of the terminal device to a reference point and from a cell associated with the target frequency point to a reference point;
information about a rate of change in time of the amount of difference in propagation time delay between the link signals from the service cell of the terminal device to the reference point and from the cell associated with the target frequency point to the reference point; and
information about a rate of change in time of the SMTC information associated with the target frequency point.

In some embodiments, time reference point for the information about the rate of change is preconfigured or agreed by a protocol, or the time reference point for the information about the rate of change is configured by a network device through the first information.

In some embodiments, the ephemeris information associated with the target frequency point includes at least one of:
ephemeris data information, and index or identification information corresponding to the ephemeris data information.

In some embodiments, the ephemeris information associated with the target frequency point is configured according to a frequency point granularity or a PCI granularity.

In some embodiments, the reference information for adjusting the Synchronization Signal/Physical Broadcast Channel Block Measurement Time Configuration (SMTC) configuration window associated with the target frequency point is configured according to the frequency point granularity or the PCI granularity.

In some embodiments, the first information is carried by one of: a system broadcast message, and a dedicated signaling.

In some embodiments, the aforementioned communication unit may be a communication interface or a transceiver, or an input/output interface of a communication chip or a system-on-chip.

It should be understood that the network device 500 according to embodiments of the present disclosure may correspond to the network device in the method embodiments of the present disclosure, and the abovementioned and other operations and/or functions of each unit in the network device 500 are to implement respective processes of the network device in the method 300 shown in FIG. 3, respectively, and will not be repeated here for brevity.

Figure 6:
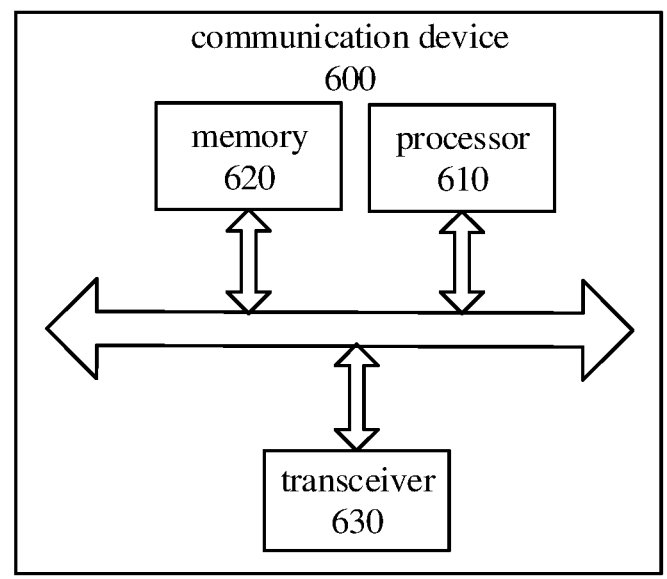
FIG. 6 is a schematic block diagram of a communication device provided according to an embodiment of the present disclosure.

FIG. 6 is a schematic structural diagram of a communication device 600 provided by an embodiment of the present disclosure. The communication device 600 shown in FIG. 6 includes a processor 610. The processor 610 may call a computer program from a memory and run the computer program, to implement the method in embodiments of the present disclosure.

In some embodiments, as shown in FIG. 6, the communication device 600 may further include a memory 620. The processor 610 may call the computer program from the memory 620 and run the computer program, to implement the method in embodiments of the present disclosure.

The memory 620 may be a separate component independent of the processor 610, or may be integrated into the processor 610.

In some embodiments, as shown in FIG. 6, the communication device 600 may further include a transceiver 630. The processor 610 may control the transceiver 630 to communicate with another device. Specifically, the transceiver 630 may transmit information or data to another device, or receive information or data transmitted by another device.

The transceiver 630 may include a transmitter and a receiver. The transceiver 630 may further include an antenna. There may be one or more antennas.

In some embodiments, the communication device 600 may be the network device in embodiments of the present disclosure, and the communication device 600 may implement respective procedures performed by the network device in various methods according to embodiments of the present disclosure. For brevity, details are not described herein again.

In some embodiments, the communication device 600 may be the terminal device in embodiments of the present disclosure, and the communication device 600 may implement respective procedures performed by the terminal device in various methods according to embodiments of the present disclosure. For brevity, details are not described herein again.

Figure 7:
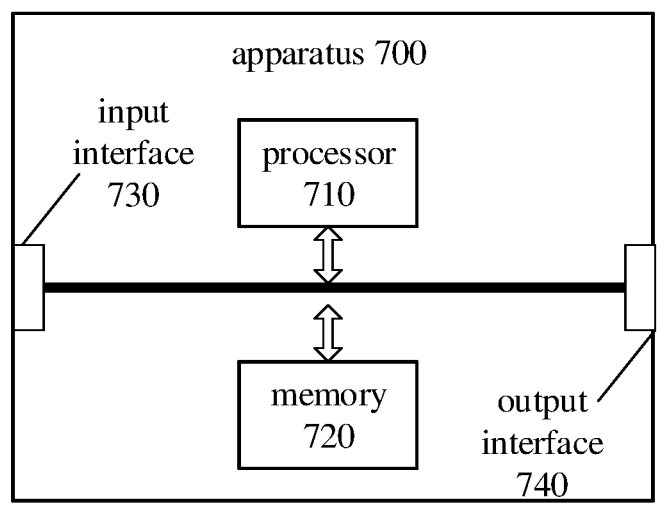
FIG. 7 is a schematic block diagram of an apparatus provided according to an embodiment of the present disclosure.

FIG. 7 is a schematic structural diagram of an apparatus according to an embodiment of the present disclosure. The apparatus 700 shown in FIG. 7 includes a processor 710 which can call and run a computer program from a memory to implement the method according to embodiments of the present disclosure.

In some embodiments, as shown in FIG. 7, the apparatus 700 may further include a memory 720. The processor 710 can call and run the computer program from the memory 720 to implement the method in embodiments of the present disclosure.

The memory 720 may be a separate device independent of the processor 710, or may be integrated in the processor 710.

In some embodiments, the apparatus 700 may further include an input interface 730. The processor 710 may control the input interface 730 to communicate with other devices or chips, and specifically, to acquire information or data transmitted by other devices or chips.

In some embodiments, the apparatus 700 may further include an output interface 740. The processor 710 may control the output interface 740 to communicate with other devices or chips, and specifically, to output information or data to other devices or chips.

In some embodiments, the apparatus may be applied to the network device in embodiments of the present disclosure, and the apparatus may implement respective procedures performed by the network device in various methods according to embodiments of the present disclosure. For brevity, details are not described herein again.

In some embodiments, the apparatus may be applied to the terminal device in embodiments of the present disclosure, and the apparatus may implement respective procedures performed by the terminal device in various methods according to embodiments of the present disclosure. For brevity, details are not described herein again.

In some embodiments, the apparatus mentioned in embodiments of the present disclosure may also be a chip, which, for example, may be a system-level chip, a system chip, a chip system, or a system-on-chip.

Figure 8:
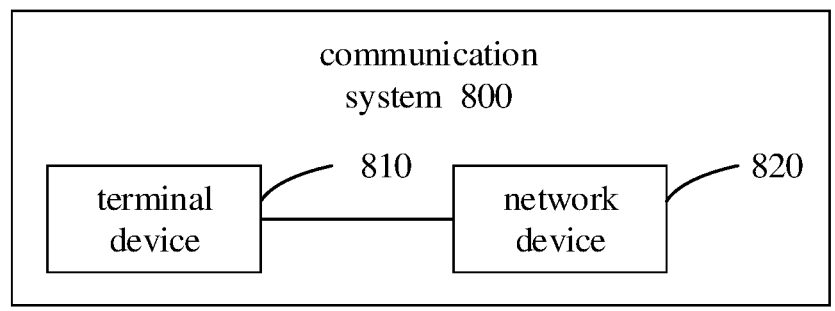
FIG. 8 is a schematic block diagram of a communication system provided according to an embodiment of the present disclosure.

FIG. 8 is a schematic block diagram of a communication system 800 provided by an embodiment of the present disclosure. As shown in FIG. 8, the communication system 800 includes a terminal device 810 and a network device 820.

The terminal device 810 may be configured to implement respective functions performed by the terminal device in the above methods, and the network device 820 may be configured to implement respective functions performed by the network device in the above methods. For brevity, details are not described herein again.

It is to be understood that the processor in embodiments of the present disclosure may be an integrated circuit chip and has a signal processing capability. In an implementation, steps in the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA), or other programmable logical device, a discrete gate or a transistor logical device, or a discrete hardware component, which may implement or perform the methods, steps, and logical block diagrams disclosed in embodiments of the present disclosure. The universal processor may be a microprocessor, or the processor may also be any conventional processor and the like. Steps of the methods disclosed in combination with embodiments of the present disclosure may be directly embodied as being executed and completed by a hardware decoding processor, or being executed and completed by a combination of hardware and software modules in the decoding processor. The software modules may be located in a mature storage medium in the art, such as a Random Access Memory (RAM), a flash memory, a Read-Only memory (ROM), a Programmable ROM (PROM), Electrically Erasable PROM (EEPROM), or a register. The storage medium is located in a memory, the processor reads information in the memory, and completes steps of the methods in combination with hardware.

It can be understood that the memory in embodiments of the present disclosure may be a volatile memory or a nonvolatile memory, or may include both volatile and nonvolatile memories. The nonvolatile memory may be a ROM, a PROM, an Erasable PROM (EPROM), an Electrically EPROM (EEPROM), or a flash memory. The volatile memory may be a RAM, and is used as an external high-speed cache. By way of exemplary illustration but not limitation, RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory in the systems and methods described by the present disclosure is intended to include, but is not limited to, memories of these and any other proper types.

It should be understood that the foregoing memory is exemplary rather than limiting. For example, the memory in embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), among others. That is to say, the memory in embodiments of the present disclosure is intended to include but is not limited to those and any other suitable types of memories.

Embodiments of the present disclosure further provide a computer-readable storage medium. The computer-readable storage medium is configured to store a computer program.

In some embodiments, the computer-readable storage medium may be applied to the network device in embodiments of the present disclosure, and the computer program causes a computer to carry out respective processes implemented by the network device in various methods according to embodiments of the present disclosure. For the sake of brevity, details are not described herein again.

In some embodiments, the computer-readable storage medium may be applied to the terminal device in embodiments of the present disclosure, and the computer program causes a computer to carry out respective processes implemented by the terminal device in various methods according to embodiments of the present disclosure. For the sake of brevity, details are not described herein again.

Embodiments of the present disclosure further provide a computer program product that includes computer program instructions.

In some embodiments, the computer program product may be applied to the network device in embodiments of the present disclosure, and the computer program instructions cause a computer to carry out respective processes implemented by the network device in various methods according to embodiments of the present disclosure. For the sake of brevity, details are not described herein again.

In some embodiments, the computer program product may be applied to the terminal device in embodiments of the present disclosure, and the computer program instructions cause a computer to carry out respective processes implemented by the terminal device in various methods according to embodiments of the present disclosure. For the sake of brevity, details are not described herein again.

Embodiments of the present disclosure further provide a computer program.

In some embodiments, the computer program may be applied to the network device in embodiments of the present disclosure. When running on a computer, the computer program causes the computer to carry out respective processes implemented by the network device in various methods according to embodiments of the present disclosure. For the sake of brevity, details are not described herein again.

In some embodiments, the computer program may be applied to the terminal device in embodiments of the present disclosure. When running on a computer, the computer program causes the computer to carry out respective processes implemented by the terminal device in various methods according to embodiments of the present disclosure. For the sake of brevity, details are not described herein again.

Those of ordinary skill in the art will appreciate that the exemplary units and algorithm steps described in connection with embodiments disclosed herein may be carried out by electronic hardware or a combination of electronic hardware and computer software. Whether the functions are implemented by hardware or software depends on particular applications and design constraints of the technical solutions. A person skilled in the art may use a different method to implement the described functions for each of the particular applications, and such implementation should not be considered as going beyond the protection scope of the present disclosure.

It may be clearly understood by a person skilled in the art that, for the purpose of convenient and brief description, with respect to the detailed working process of the system, device, and unit, reference may be made to a corresponding process in the foregoing method embodiments, details of which are not described herein again.

According to embodiments provided by the present disclosure, it should be understood that the disclosed systems, devices, and methods may be implemented in other ways. For example, the device embodiments described above are merely illustrative. For example, the division of units is only a kind of logical function division. In practice implementations, there may be other division manners. For example, multiple units or components may be combined or integrated into another system, or some features may be ignored or not performed. In addition, the mutual coupling or direct coupling or communication connection as illustrated or discussed may be indirect coupling or communication connection through some interfaces, devices or units, and may be in electrical, mechanical or other forms.

The units described as separated parts may be or may not be physically separated, and the parts displayed as units may be or may not be physical units. That is, the units may be located in one place, or may be distributed over multiple network units. Some or all of the units may be selected according to actual needs so as to achieve the objectives of the solutions in embodiments.

In addition, individual functional units in each embodiment of the present disclosure may be integrated in one processing unit, or the units may exist separately physically, or two or more units may be integrated in one unit.

The functions may also be stored in a computer-readable storage medium if being implemented in the form of software functional unit and sold or used as an independent product. Based on such understanding, the part being essential or contributing to the prior art of the technical solutions of the present disclosure, or just part of the technical solutions, may be embodied in the form of software product. The computer software product is stored in a storage medium, and includes instructions to cause a computer device (which may be a personal computer, a server, or a network device, etc.) to perform all or part of steps of the methods described in embodiments of the present disclosure. The foregoing storage medium includes any medium that is capable of storing program codes, such as a USB disk, a mobile hard disk, a Read Only Memory (ROM), a Random Access Memory (RAM), a magnetic disk, an optical disk, or the like.

Those described above are merely specific embodiments of the present disclosure, and the protection scope of the present disclosure is not limited thereto. Any change or substitution that is readily conceived of by a person skilled in the art within the technical scope disclosed by the present disclosure shall fall within the protection scope of the present disclosure. Therefore, the protection scope of the present disclosure shall be defined by the appended claims.

What is claimed is:

1. A wireless communication method, comprising:
    receiving, by a terminal device, first information, wherein the first information is used by the terminal device to search for a signal at a target frequency point, and the first information comprises:
    ephemeris information associated with the target frequency point, information about the target frequency point, Physical Cell Identity (PCI) list information associated with the target frequency point, and reference information for adjusting a Synchronization Signal/Physical Broadcast Channel Block Measurement Time Configuration (SMTC) configuration window associated with the target frequency point;
    wherein the ephemeris information associated with the target frequency point comprises at least one of:
    ephemeris data information,
    index or identification information corresponding to the ephemeris data information;
    wherein the ephemeris information associated with the target frequency point is configured according to a frequency point granularity and a Physical Cell Identity (PCI) granularity; and
    wherein the reference information for adjusting the SMTC configuration window associated with the target frequency point comprises:
    information about a rate of change in time of the amount of difference in propagation time delay between the feed link signals for the service satellite of the terminal device and the satellite associated with the target frequency point.

2. The method according to claim 1, wherein the first information further comprises at least one of:
    SMTC information associated with the target frequency point;
    SubCarrier Spacing (SCS) information associated with the target frequency point; and
    frequency band information associated with the target frequency point.

3. The method according to claim 1, wherein;
    the reference information for adjusting the SMTC configuration window associated with the target frequency point further comprises at least one of:
    information about an amount of difference in propagation time delay between feed link signals for a service satellite of the terminal device and a satellite associated with the target frequency point;
    reference point information;
    information about an amount of difference in propagation time delay between link signals from a service cell of the terminal device to a reference point and from a cell associated with the target frequency point to the reference point;
    information about a rate of change in time of the amount of difference in propagation time delay between the link signals from the service cell of the terminal device to the reference point and from the cell associated with the target frequency point to the reference point; and
    information about a rate of change in time of the SMTC information associated with the target frequency point.

4. The method according to claim 3, wherein time reference point for the information about the rate of change is preconfigured or agreed by a protocol, or the time reference point for the information about the rate of change is configured by a network device through the first information.

5. The method according to claim 1, wherein
    the first information further comprises reference information for adjusting a Synchronization Signal/Physical Broadcast Channel Block Measurement Time Configuration (SMTC) configuration window associated with the target frequency point; and
    the reference information for adjusting the SMTC configuration window associated with the target frequency point is configured according to a frequency point granularity or a PCI granularity.

6. The method according to claim 1, wherein the first information is carried by one of:
    a system broadcast message, and
    a dedicated signaling.

7. A wireless communication method, comprising:
sending, by a network device, first information to a terminal device, wherein the first information is used by the terminal device to search for a signal at a target frequency point, and the first information comprises:
ephemeris information associated with the target frequency point, information about the target frequency point, Physical Cell Identity (PCI) list information associated with the target frequency point, and reference information for adjusting a Synchronization Signal/Physical Broadcast Channel Block Measurement Time Configuration (SMTC) configuration window associated with the target frequency point;
wherein the ephemeris information associated with the target frequency point comprises at least one of:
ephemeris data information,
index or identification information corresponding to the ephemeris data information;
wherein the ephemeris information associated with the target frequency point is configured according to a frequency point granularity and a Physical Cell Identity (PCI) granularity; and
wherein the reference information for adjusting the SMTC configuration window associated with the target frequency point comprises:
information about a rate of change in time of the amount of difference in propagation time delay between the feed link signals for the service satellite of the terminal device and the satellite associated with the target frequency point.

8. The method according to claim 7, wherein the first information further comprises at least one of:
SMTC information associated with the target frequency point;
SubCarrier Spacing (SCS) information associated with the target frequency point; and
frequency band information associated with the target frequency point.

9. The method according to claim 7, wherein;
the reference information for adjusting the SMTC configuration window associated with the target frequency point further comprises at least one of:
information about an amount of difference in propagation time delay between feed link signals for a service satellite of the terminal device and a satellite associated with the target frequency point;
reference point information;
information about an amount of difference in propagation time delay between link signals from a service cell of the terminal device to a reference point and from a cell associated with the target frequency point to the reference point;
information about a rate of change in time of the amount of difference in propagation time delay between the link signals from the service cell of the terminal device to the reference point and from the cell associated with the target frequency point to the reference point; and
information about a rate of change in time of the SMTC information associated with the target frequency point.

10. The method according to claim 9, wherein time reference point for the information about the rate of change is preconfigured or agreed by a protocol, or the time reference point for the information about the rate of change is configured by a network device through the first information.

11. The method according to claim 7, wherein the first information is carried by one of:
a system broadcast message, and
a dedicated signaling.

12. The method according to claim 7, wherein
the reference information for adjusting the SMTC configuration window associated with the target frequency point is configured according to a frequency point granularity or a PCI granularity.

13. A terminal device, comprising: a processor and a memory, wherein the memory is configured to store a computer program, and the processor is configured to call and run the computer program stored in the memory, to cause the terminal device to perform a wireless communication method, comprising:
receiving first information, wherein the first information is used by the terminal device to search for a signal at a target frequency point, and the first information comprises:
ephemeris information associated with the target frequency point, information about the target frequency point, Physical Cell Identity (PCI) list information associated with the target frequency point, and reference information for adjusting a Synchronization Signal/Physical Broadcast Channel Block Measurement Time Configuration (SMTC) configuration window associated with the target frequency point;
wherein the ephemeris information associated with the target frequency point comprises at least one of:
ephemeris data information,
index or identification information corresponding to the ephemeris data information;
wherein the ephemeris information associated with the target frequency point is configured according to a frequency point granularity and a Physical Cell Identity (PCI) granularity; and
wherein the reference information for adjusting the SMTC configuration window associated with the target frequency point comprises:
information about a rate of change in time of the amount of difference in propagation time delay between the feed link signals for the service satellite of the terminal device and the satellite associated with the target frequency point.

14. The terminal device according to claim 13, wherein the first information further comprises at least one of:
SMTC information associated with the target frequency point;
SubCarrier Spacing (SCS) information associated with the target frequency point; and
frequency band information associated with the target frequency point.

15. The terminal device according to claim 13, wherein the first information is carried by one of:
a system broadcast message, and
a dedicated signaling.

16. The terminal device according to claim 13, wherein;
the reference information for adjusting the SMTC configuration window associated with the target frequency point further comprises at least one of:
information about an amount of difference in propagation time delay between feed link signals for a service satellite of the terminal device and a satellite associated with the target frequency point;

reference point information;

information about an amount of difference in propagation time delay between link signals from a service cell of the terminal device to a reference point and from a cell associated with the target frequency point to the reference point;

information about a rate of change in time of the amount of difference in propagation time delay between the link signals from the service cell of the terminal device to the reference point and from the cell associated with the target frequency point to the reference point; and information about a rate of change in time of the SMTC information associated with the target frequency point.

17. The terminal device according to claim 16, wherein time reference point for the information about the rate of change is preconfigured or agreed by a protocol, or the time reference point for the information about the rate of change is configured by a network device through the first information.

18. The terminal device according to claim 13, wherein the reference information for adjusting the SMTC configuration window associated with the target frequency point is configured according to a frequency point granularity or a PCI granularity.

* * * * *